United States Patent [19]
Gatin

[11] 4,268,004
[45] May 19, 1981

[54] SELF-RELEASING HOSE CLAMP

[76] Inventor: Leonard W. Gatin, 1173 Pleasant St., Kamloops, British Columbia, Canada, V2C 3C1

[21] Appl. No.: 80,742

[22] Filed: Oct. 1, 1979

[51] Int. Cl.³ .............................................. F16L 55/14
[52] U.S. Cl. ........................................ 251/5; 251/6; 251/9; 251/32
[58] Field of Search .............................. 251/5, 6, 9, 32

[56] References Cited

U.S. PATENT DOCUMENTS

| | | | |
|---|---|---|---|
| 742,656 | 10/1903 | Horsey | 251/6 |
| 1,330,523 | 2/1920 | Evitts | 251/6 |
| 1,914,851 | 6/1933 | Fyfe | 251/4 |
| 1,959,074 | 5/1934 | Bloxsom | 251/6 |
| 4,071,039 | 1/1978 | Goof | 251/5 |
| 4,114,653 | 9/1978 | Carlin | 137/67 |

Primary Examiner—William R. Cline
Assistant Examiner—H. Jay Spiegel
Attorney, Agent, or Firm—Townsend and Townsend

[57] ABSTRACT

A self-releasing clamp for a fluid carrying hose comprises an inclined guide and a roller carried by the guide which is movable along the guide between a hose releasing position and a hose clamping position. There is a hose support for holding the hose against the roller. A mechanism provides a space between the roller and the hose support when the roller is in the clamping position. The space providing mechanism permits a limited flow of fluid past the clamp to increase pressure in the hose downstream from the clamp when the fluid flow downstream from the clamp is stopped, expanding the hose between the hose support and the roller and moving the roller to the hose releasing position.

17 Claims, 3 Drawing Figures

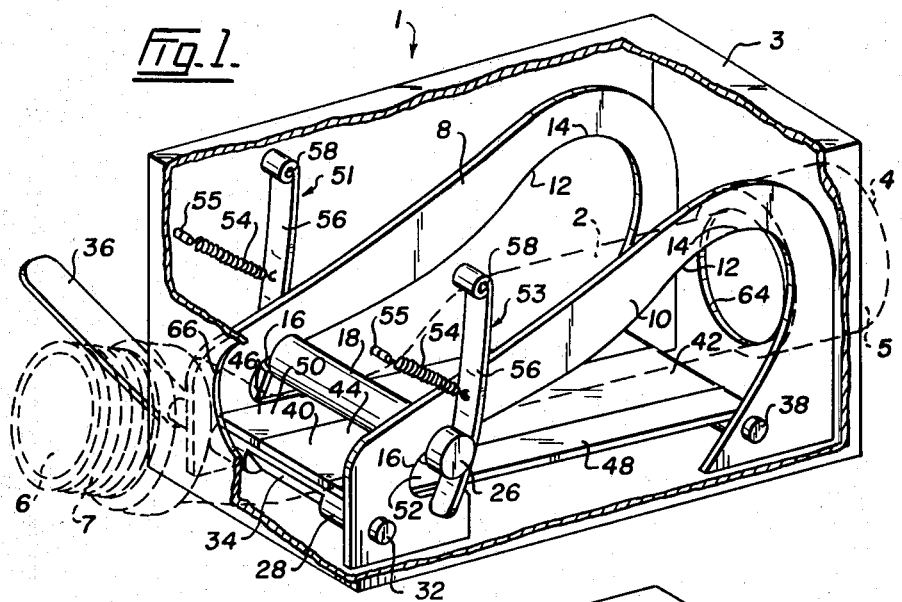
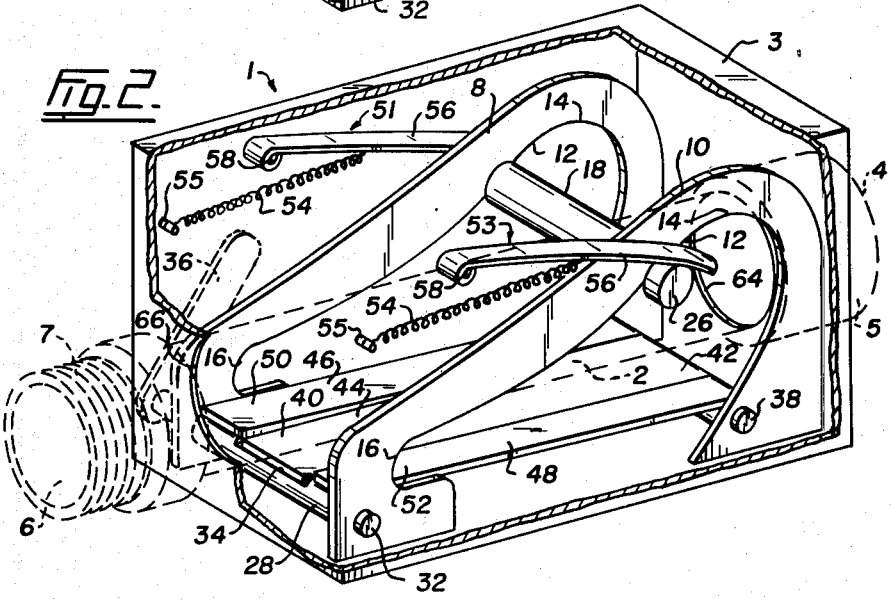
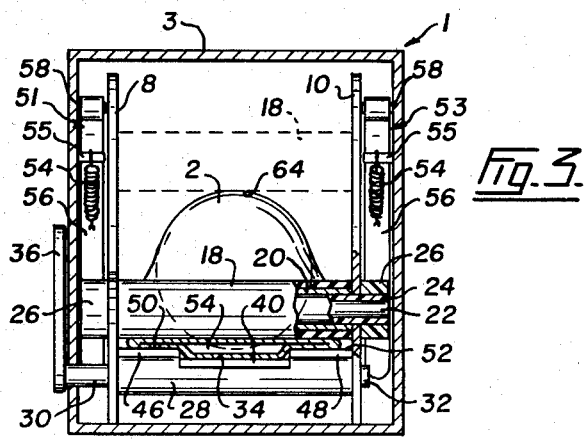

SELF-RELEASING HOSE CLAMP

BACKGROUND OF THE INVENTION

This invention relates to a self-releasing clamp for a fluid carrying hose.

Clamps of the general type employing a roller and an inclined guide are found in earlier patents. For example, in U.S. Pat. No. 1,330,523 to Evitts, the flow through the tube is stopped when the roller is at its lowermost position. A similar tube clamp is found in U.S. Pat. No. 1,959,074 to Bloxsom. U.S. Pat. No. 4,114,653 to Carlin shows a device which permits an initially limited flow of water. Other clamp constructions are shown in U.S. Pat. Nos. 742,656 to Horsey and 1,914,851 to Fyfe.

Earlier patents do not reveal a simple mechanical hose clamp which can be released from a remote location and which can be reused an unlimited number of times. Additionally, earlier clamps must be closed manually, once opened.

SUMMARY OF THE INVENTION

A self-releasing clamp for a fluid carrying hose comprises an inclined guide and a roller carried by the guide and movable along the guide between a hose releasing position and a hose clamping position. A hose support holds the hose against the roller. There is means for providing a space between the roller and the hose support when the roller is in the clamping position. The space providing means permits a limited flow of fluid past the clamp to increase pressure in the hose downstream from the clamp when fluid flow downstream from the clamp is stopped, expanding the hose between the hose support and the roller and moving the roller to the hose releasing position.

While prior art hose clamps include the use of rollers and inclined guides, the present invention has the important distinction of permitting a controlled leakage of water past the roller when it is in the lower position. When the flow of water downstream from the clamp is stopped, the pressure on both sides of the roller is equalized and the roller is pushed to the upper position, releasing the hose. When used on fire hoses, a clamp according to the present invention stops the flow of water through the hose except for the controlled leakage. The hoses can therefore be laid ahead of the water and are flexible and easier to handle. The hose can be laid by a pumper without filling the hose in the hose bed of the pumper. However, once the flow of water from the end of the hose is stopped, for example by closing a nozzle attached to the hose or by connecting the hose to a pump, the limited flow of water past the clamp equalizes the pressure on each side of the roller and the roller moves to the upper position. A full flow of water is then available through the hose. Unlike earlier clamps, the present invention provides a clamp which is automatically reset to a stop flow or limited flow position when the hose is emptied.

In drawings which illustrate embodiments of the invention:

FIG. 1 is an isometric view of a self-releasing hose clamp, according to an embodiment of the invention, positioned over a hose and with the roller in the clamping position;

FIG. 2 is an isometric view equivalent to FIG. 1 with the roller in the hose releasing position; and FIG. 3 is a front elevational view of the hose clamp shown partly broken away.

DESCRIPTION OF THE PREFERRED EMBODIMENTS

The drawings show a self-releasing clamp 1 for a fluid carrying hose 2, shown in broken lines. The clamp 1 is fitted over the hose 2 within case 3 and in the position shown relative to the upstream end 4 and the downstream end 6 of the hose. The preferred embodiment is described below as employed with a fire hose, but the invention may have other applications.

The clamp 1 includes an inclined guide comprising a pair of spaced-apart, identical guide members 8 and 10. Each of the members 8 and 10 has an inclined edge or guide track 12 with an upper end 14 and a lower end 16. Guide track 12 of each member is adapted to carry and guide one end of the roller 18 which is of rubber or a similar material in the preferred embodiment. Roller 18 is annular and is tightly fitted over a metal bushing 20. A steel shaft 22 extends through the bushing 20 and is fitted with a bushing 24. Rollers 26 are tightly fitted to each end of the shaft 22. The guide members 8 and 10 are received between the rollers 26 and the roller 18. The rollers 26 prevent skewing of the roller 18 as it travels along the guide tracks 12.

The guide members 8 and 10 are interconnected near the lower ends 16 of the guide tracks 12 by a cam member 28 which is pivotally connected to members 8 and 10 by means of journals 30 and 32 respectively. One side of the cam 28 is recessed, providing a flat surface 34 near the center of the cam member. A radially extending lever 36 is connected to one end of cam member 28 to pivot the cam member relative to members 8 and 10.

The ends of members 8 and 10 opposite cam member 28 are interconnected by a pin 38. A hose support includes the central clamping member 40 and side clamping members 46 and 48. Central member 40 extends longitudinally between the members 8 and 10 and has an end 42 distal the lower end 16 of the guide tracks 12 which forms a hinge about pin 38, providing a pivotal connection between member 40 and members 8 and 10. Member 40 has a flat top surface 44. The end of surface 44 adjacent ends 16 of guide tracks 12 provides means for holding hose 2 against roller 18 when the roller is in the position shown in FIG. 1. The member 40 is spaced-apart from guide members 8 and 10 by the side clamping members 46 and 48 which are fixed and have flat upper surfaces 50 and 52, respectively, and extend between pin 38 and cam member 28. When the roller 18 is in the position of FIG. 1 and shown in solid lines in FIG. 3, the top surfaces 50 and 52 of members 46 and 48 are adjacent the roller to squeeze the hose 2 flat, as shown.

Cam member 28 comprises means for holding hose 2 against roller 18 in the clamping position and means for providing the space 54 between the roller 18 and clamping member 40 as seen in FIG. 3. When lever 36 is pivoted rearwardly as shown in FIG. 2, the flat surface 34 of cam member 28 faces upwardly towards member 40. This permits member 40 to pivot downwardly about pin 38 away from the roller, providing the space 54 and secures member 40 in this position spaced-apart from roller 18. When lever 36 is pivoted forwardly as shown in FIG. 1, member 40 is raised so that its top surface 44 is adjacent the top surfaces 50 and 52 of members 46 and 48, eliminating the space 54.

Clamp 1 also includes identical mechanisms 51 and 53 to each side thereof for biasing roller 18 towards the position of FIG. 1. Each mechanism comprises a coil spring 54 connected at one end to the case 3 by means of a pin 55. The end of each spring 54 opposite pin 55 is connected to a lever 56 which is pivotally connected to the case 3 by a pin 58. Springs 54 resiliently bias levers 56 towards rollers 26 and thereby bias roller 18 towards the lower ends 16 of the guide tracks 12.

As mentioned, the entire clamp 1 is housed in a case 3 which protects the clamp from adverse conditions such as freezing water. Case 3 has apertures 64 and 66 for the hose 2. In use, the coupling 5 of hose 2 can be connected to a fire hydrant or other source of fluid, while the coupling 7 at the opposite end can be connected to a length of fire hose. Before the hydrant is opened, the springs 54 pull levers 56 and roller 18 towards the hose clamping position of FIG. 1. In this position, roller 18 is adjacent the lower ends 16 of the guide tracks 12 of the members 8 and 10. Hose 2 is squeezed between the top surfaces 50 and 52 of the side clamping members 46 and 48. When cam member 28 is rotated by lever 36 so the flat surface 34 does not face the central clamping member 40, the member 40 is in a raised position so that its upper surface 44 is adjacent the surfaces 50 and 52. This squeezes the hose 2 flat, completely shutting off the flow of water. It is possible to move roller 18 to the hose releasing position of FIG. 2 by using a pumper to pump back water through the hose towards the roller. When the pressure becomes equal on both sides of roller 18, the hose expands, moving roller 18 towards the upper ends 14 of the guide tracks 12. With the roller in this position, a full flow of water is available from the hydrant.

The roller 18 can also be released automatically without the use of the pumper. This is accomplished by rotating cam member 28 by means of lever 36 so the flat surface 34 faces central clamping member 40. This forms the space 54 between the roller 18 and the clamping member 40, permitting a limited flow of water past the clamp 1. When it is desired to release clamp 1, it is simply necessary to stop the flow of water at the end of the hose. This can be accomplished, for example, by closing a nozzle connected to the downstream end of the hose or simply by connecting the hose to a pumper. The water flowing through opening 54 will eventually fill up the hose downstream from clamp 1 and equalize the pressure on both sides of roller 18. When this occurs, the hose expands between member 40 and roller 18 and moves the roller 18 upwardly to the hose releasing position adjacent ends 14 of guide tracks 12 as shown in FIG. 2.

When the flow of water is shut off at the hydrant, hose 2 empties and springs 54 again return roller 18 to the hose clamping position adjacent the lower ends 16 of guide tracks 12.

The invention eliminates the need for a fire fighter to remain at the hydrant to control the water supply to the fire or the pumpers. Furthermore, complicated mechanisms incorporating such features as radio control are not required.

What is claimed is:

1. A self-releasing clamp for a fluid carrying hose, comprising:
   an inclined guide;
   a roller carried by the guide and movable along the guide between a hose releasing position and a hose clamping position;
   a hose support for holding the hose against the roller in the clamping position; and
   means for providing a space between the roller and the hose support when the roller is in the clamping position, said space providing means permitting a limited flow of fluid past the clamp to increase pressure in the hose downstream from the clamp when fluid flow downstream from the clamp is stopped, expanding the hose between the hose support and the roller and moving the roller to the hose releasing position the space providing means comprising means for moving the hose support away from the roller and for securing the hose support in a position spaced-apart from the roller when the roller is in the clamping position, and a pivotal connection on the hose support and means for holding the hose support against the hose when the roller is in the clamping position.

2. A clamp as claimed in claim 1, the means for holding comprising a cam.

3. A clamp as claimed in claim 1, the cam being rotatable to provide said space.

4. A clamp as claimed in claim 3, the cam having a planar surface rotatable to a position facing the roller.

5. A clamp as claimed in claim 1, the guide comprising a pair of spaced-apart guide members, the hose being receivable between the guide members, the roller extending perpendicularly between the guide members.

6. A clamp as claimed in claim 5, the means for providing a space further comprising said pivotal connection being located near an end of the hose support distal the clamping position of the roller and said means for moving and said means for holding comprising a cam near an end of the hose support adjacent the clamping position of the roller.

7. A clamp as claimed in claim 6, the cam being pivotally connected to the guide members and extending perpendicularly therebetween.

8. A clamp as claimed in claim 7, comprising a lever for pivoting the cam to a raised position, moving the hose support towards the roller for stopping the flow of fluid past the clamp, or to a lowered position providing the space between the roller and the hose support.

9. A clamp as claimed in claim 8, the cam having a flat surface adjacent the hose support.

10. A clamp as claimed in claim 8, the hose support extending longitudinally between the guide tracks.

11. A clamp as claimed in claim 10, the hose support comprising a central clamping member spaced-apart from the guide members by fixed clamping members, said fixed members being flat and adjacent the roller in the clamping position, the central clamping member having a flat surface adjacent the fixed surfaces when the cam is at the raised position.

12. A clamp as claimed in claim 8, the cam comprising an elongate cylindrical pin with a recess on one side, the cam being at the lowered position when the recess faces the central clamping member.

13. A clamp as claimed in claim 1 or claim 6 comprising resilient means biasing the roller towards the clamping position.

14. A clamp as claimed in claim 13, the resilient means comprising a coil spring.

15. A clamp as claimed in claim 14, the coil spring being connected to a lever, biasing the lever towards the roller and thereby biasing the roller towards the clamping position.

16. A clamp as claimed in claim 15 comprising two said resilient means, said resilient means being near opposite ends of the roller.

17. A clamp as claimed in claim 1 or claim 16 comprising a protective casing for the clamp with apertures for the hose.

* * * * *